(12) United States Patent
Tanabe (10) Patent No.: US 11,705,816 B2
(45) Date of Patent: Jul. 18, 2023

(54) ISOLATION TRANSFORMER, AND POWER CONVERSION DEVICE IN WHICH THE ISOLATION TRANSFORMER IS USED

(71) Applicant: Mitsubishi Electric Corporation, Tokyo (JP)

(72) Inventor: Hayato Tanabe, Tokyo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 324 days.

(21) Appl. No.: 17/179,588

(22) Filed: Feb. 19, 2021

(65) Prior Publication Data

US 2022/0006388 A1    Jan. 6, 2022

(30) Foreign Application Priority Data

Jul. 3, 2020  (JP) .............................. JP2020-115342

(51) Int. Cl.
*H02M 3/335* (2006.01)
*H01F 27/24* (2006.01)
*H01F 27/02* (2006.01)
*H01F 27/28* (2006.01)

(52) U.S. Cl.
CPC ........ *H02M 3/33573* (2021.05); *H01F 27/02* (2013.01); *H01F 27/24* (2013.01); *H01F 27/28* (2013.01); *H01F 27/2876* (2013.01)

(58) Field of Classification Search
CPC .... H02M 3/33573; H01F 27/02; H01F 27/24; H01F 27/28; H01F 27/2876
See application file for complete search history.

(56) References Cited

U.S. PATENT DOCUMENTS

| 9,299,489 B2 * | 3/2016 | Lotfi ...................... H01F 27/29 |
| 2018/0182527 A1 | 6/2018 | Fujita |
| 2021/0327634 A1 * | 10/2021 | Liang ..................... H01F 27/24 |

(Continued)

FOREIGN PATENT DOCUMENTS

| EP | 3067903 A1 | 9/2016 |
| JP | 2003-272929 A | 9/2003 |
| JP | 2004-303857 A | 10/2004 |

(Continued)

OTHER PUBLICATIONS

Communication dated Mar. 29, 2022 from the Japanese Patent Office in JP Application No. 2020-115342.

(Continued)

*Primary Examiner* — Adolf D Berhane
(74) *Attorney, Agent, or Firm* — Sughrue Mion, PLLC; Richard C. Turner (57) ABSTRACT

The isolation transformer includes two kinds of winding, a high voltage side winding and a low voltage side winding, and the high voltage side winding and the low voltage side winding are formed in winding layers, wherein the high voltage side winding includes windings formed in multiple winding layers, a winding layer having a different number of turns exists in one or more kinds of the two kinds of winding among the windings formed in the multiple winding layers, winding layers wherein current flows in the same direction are stacked in such a way as not to be neighboring, and at least one of winding layers having the greatest number of turns is disposed as a layer other than an outermost layer.

19 Claims, 10 Drawing Sheets

(56) References Cited

U.S. PATENT DOCUMENTS

2022/0199317 A1\* 6/2022 Kawamura ............. H01F 27/24

FOREIGN PATENT DOCUMENTS

| | | |
|---|---|---|
| JP | 2012-80011 A | 4/2012 |
| JP | 2017-79493 A | 4/2017 |
| JP | 2018-110477 A | 7/2018 |
| JP | 2019-165148 A | 9/2019 |
| WO | 2015068265 A1 | 5/2015 |

OTHER PUBLICATIONS

Communication dated Sep. 21, 2021 from the Japanese Patent Office in Application No. 2020-115342.

\* cited by examiner

FIG.12

ISOLATION TRANSFORMER, AND POWER CONVERSION DEVICE IN WHICH THE ISOLATION TRANSFORMER IS USED

BACKGROUND OF THE INVENTION

Field of the Invention

The present application relates to an isolation transformer, and to a power conversion device in which the isolation transformer is used.

Description of the Related Art

An insulated power conversion device wherein an input and an output can be electrically isolated is widely used among power systems, power supplies, and the like. For example, a two-battery vehicle-use power supply device is used in a vehicle-mounted power supply system of a hybrid vehicle, and an output of a high voltage battery is configured so as to supply power to a low voltage load via a step-down DC-DC converter. A reduction in size of this kind of power conversion device is constantly being demanded in order to improve the loading properties of an automobile.

An isolation transformer is used in an insulated power conversion device with an object of electrical isolation of an input power supply and a load, and of voltage conversion. An isolation transformer is configured of a transformer core having iron as a main component, and a primary winding and a secondary winding wound around the transformer core, wherein a number of turns in accordance with a target transformation ratio is set for the primary winding and the secondary winding.

Generally, a method that increases switching frequency is used in order to reduce the size of a power conversion device. This is because an amount of change in transformer core magnetic flux density, and transformer core loss (iron loss), can be reduced, and the transformer core can be reduced in size, by increasing the switching frequency.

However, a high frequency resistance value of a winding increases in accompaniment to an increase in switching frequency, and winding loss (copper loss) increases. As a winding temperature rises in accompaniment to an increase in copper loss, it is necessary to reduce winding loss by increasing a winding sectional area in order that a winding temperature upper limit is not exceeded, or to provide a cooling structure in the winding, and the isolation transformer increases in size.

As a further reduction in size of a power conversion device is being demanded, a reduction in size of an isolation transformer, which is a main component, is essential. Although it is necessary to increase switching frequency in order to reduce the size of an isolation transformer, a winding resistance value and winding loss increase in accompaniment to a size reduction, because of which the size reduction is limited.

For example, a thin high current transformer wherein winding high frequency resistance is reduced by high voltage side windings and low voltage side windings being alternately stacked in multiple layers is disclosed in Patent Literature 1, but there is no mention of a case in which the number of turns in each winding layer differs, and what kind of configuration is optimally adopted in such a case is not indicated.

Patent Literature 1: JP-A-2004-303857

SUMMARY OF THE INVENTION

The present application has been made to solve the above problem and an object of the present application is to provide an isolation transformer such that winding loss of the isolation transformer is reduced, efficiency is increased, and a winding temperature rise is restricted, thereby enabling a reduction in size, and of providing a power conversion device in which the isolation transformer is used.

An isolation transformer disclosed in the present application is an isolation transformer including a core portion that forms a magnetic circuit, and at least two kinds of winding, on a high voltage side and a low voltage side, wound around the core portion, each of the two kinds of winding being formed in winding layers, wherein the two kinds of winding include windings formed in a multiple of winding layers, a winding layer having a different number of turns exists in one or more kinds of the two kinds of winding among the windings formed in the multiple of winding layers, winding layers wherein current flows in the same direction are stacked in such a way as not to be neighboring, and at least one of winding layers having the greatest number of turns is disposed as a layer other than an outermost layer.

According to the isolation transformer disclosed in the present application, an isolation transformer such that winding loss of the isolation transformer is reduced, efficiency is increased, and a winding temperature rise is restricted, thereby enabling a reduction in size, is obtained.

The foregoing and other objects, features, aspects, and advantages of the present application will become more apparent from the following detailed description of the present application when taken in conjunction with the accompanying drawings.

DETAILED DESCRIPTION OF THE PREFERRED EMBODIMENTS

Hereafter, an embodiment of the present application will be described while referring to the drawings. The description will be given by allotting identical reference signs to identical or corresponding portions in the drawings.

First Embodiment

A power conversion device according to a first embodiment includes a DC-DC converter that reduces voltage of a high voltage battery and supplies the reduced voltage to a load, a control unit, and a cooler. The DC-DC converter includes a power conversion unit configured of semiconductor switching elements, an isolation transformer, and rectifying diodes, and the isolation transformer includes a winding unit configured of a magnetic core forming a magnetic circuit, a primary winding that is a high voltage winding, and a secondary winding that is a low voltage winding. The primary winding and the secondary winding of the isolation transformer respectively have primary winding layers and secondary winding layers formed by being wound in a planar direction, the winding unit is formed by the primary winding layers and the secondary winding layers being alternately stacked, and a winding layer with the greatest number of turns is disposed as a layer other than an outermost layer.

Firstly, a configuration of a power conversion device according to the first embodiment will be described based on FIG. 1.

Figure 1:
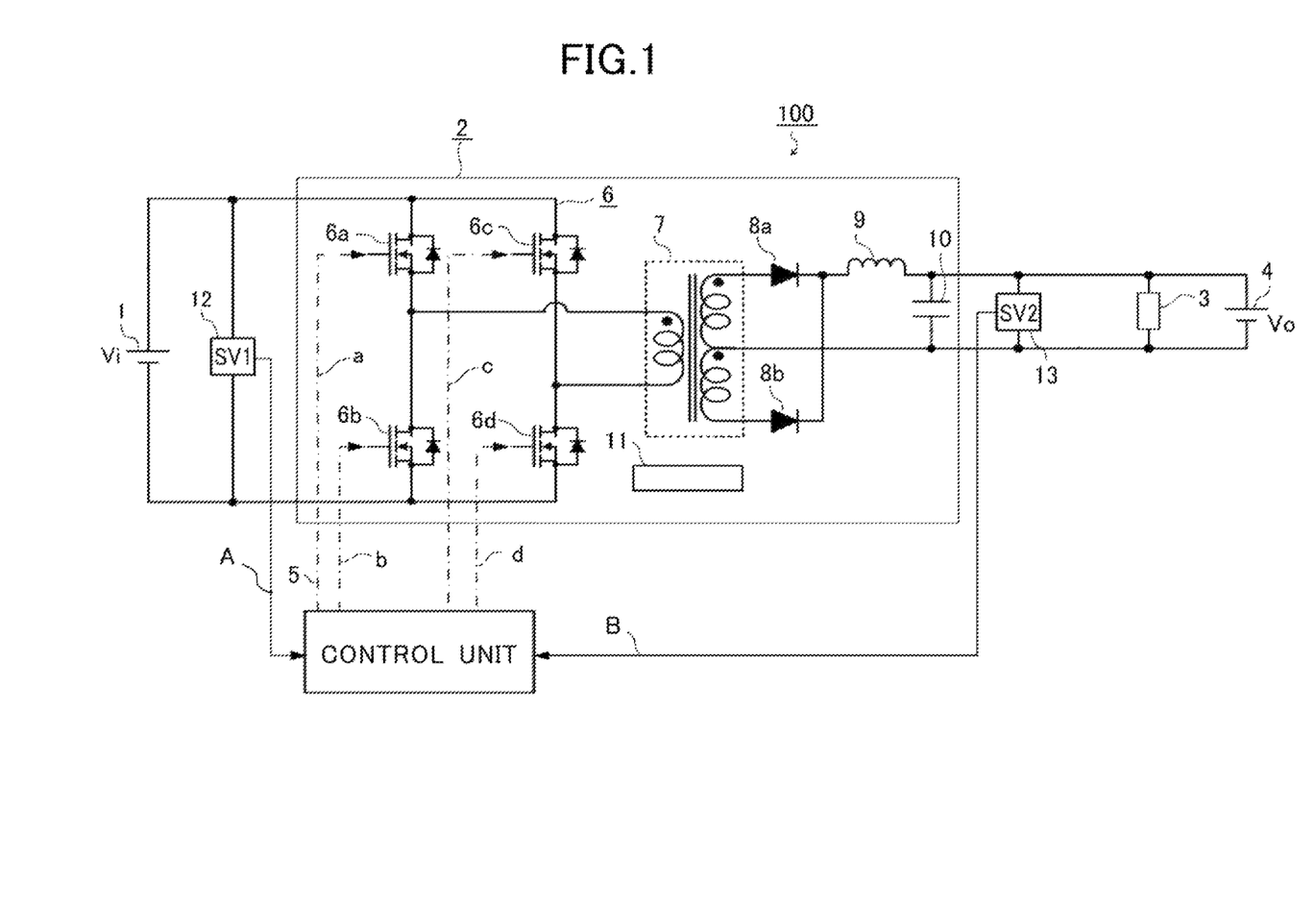
FIG. 1 is a configuration diagram of a power conversion device in which an isolation transformer according to a first embodiment is used.

In FIG. 1, a power conversion device 100 includes, as main constituent components from an input side to an output side, a high voltage battery 1 that is a main power supply, a DC-DC converter 2, a load 3, and a low voltage battery 4, and includes a control unit 5 that controls the DC-DC converter 2. Herein, $V_i$ indicates a power supply voltage of the high voltage battery 1, and $V_o$ indicates an output voltage.

The DC-DC converter 2 includes a power conversion unit 6 wherein a full-bridge is configured of four semiconductor switching elements 6a to 6d, an isolation transformer 7, rectifying diodes 8a and 8b, a smoothing reactor 9, and a smoothing capacitor 10. Also, the DC-DC converter 2 includes a cooler 11, whereby heat generating parts such as the semiconductor switching elements 6a to 6d of the power conversion unit 6, the isolation transformer 7, the rectifying diodes 8a and 8b, and the smoothing reactor 9 are cooled, and protected from heat.

A connection point of a source of the semiconductor switching element 6a and a drain of the semiconductor switching element 6b is connected to one end of a primary winding of the isolation transformer 7, and another end of the primary winding is connected to a connection point of a source of the semiconductor switching element 6c and a drain of the semiconductor switching element 6d. Herein, for example, metal-oxide-semiconductor field-effect transistors (MOSFETs) are envisaged as the semiconductor switching elements 6a to 6d.

The rectifying diodes 8a and 8b are connected to a secondary winding of the isolation transformer 7 for secondary side rectification, and furthermore, the smoothing reactor 9 and the smoothing capacitor 10 are connected. The DC-DC converter 2 is an insulated DC-DC converter that includes the isolation transformer 7, and an output thereof supplies a predetermined direct current voltage to the load 3 and the low voltage battery 4.

When the power conversion device 100 is applied to an electric vehicle or a hybrid vehicle, the high voltage battery 1 is typically a rechargeable battery such as a nickel metal hydride battery or a lithium ion battery, and voltage of the high voltage battery 1 is at least 100V.

Herein, a basic operation of the DC-DC converter 2 will be described using FIGS. 2 to 7. The DC-DC converter 2 according to the first embodiment is such that four operating modes (mode 1 to mode 4) shown in FIGS. 2 to 5 exist in accordance with a state of each of the semiconductor switching elements 6a to 6d of the power conversion unit 6.

Figure 2:
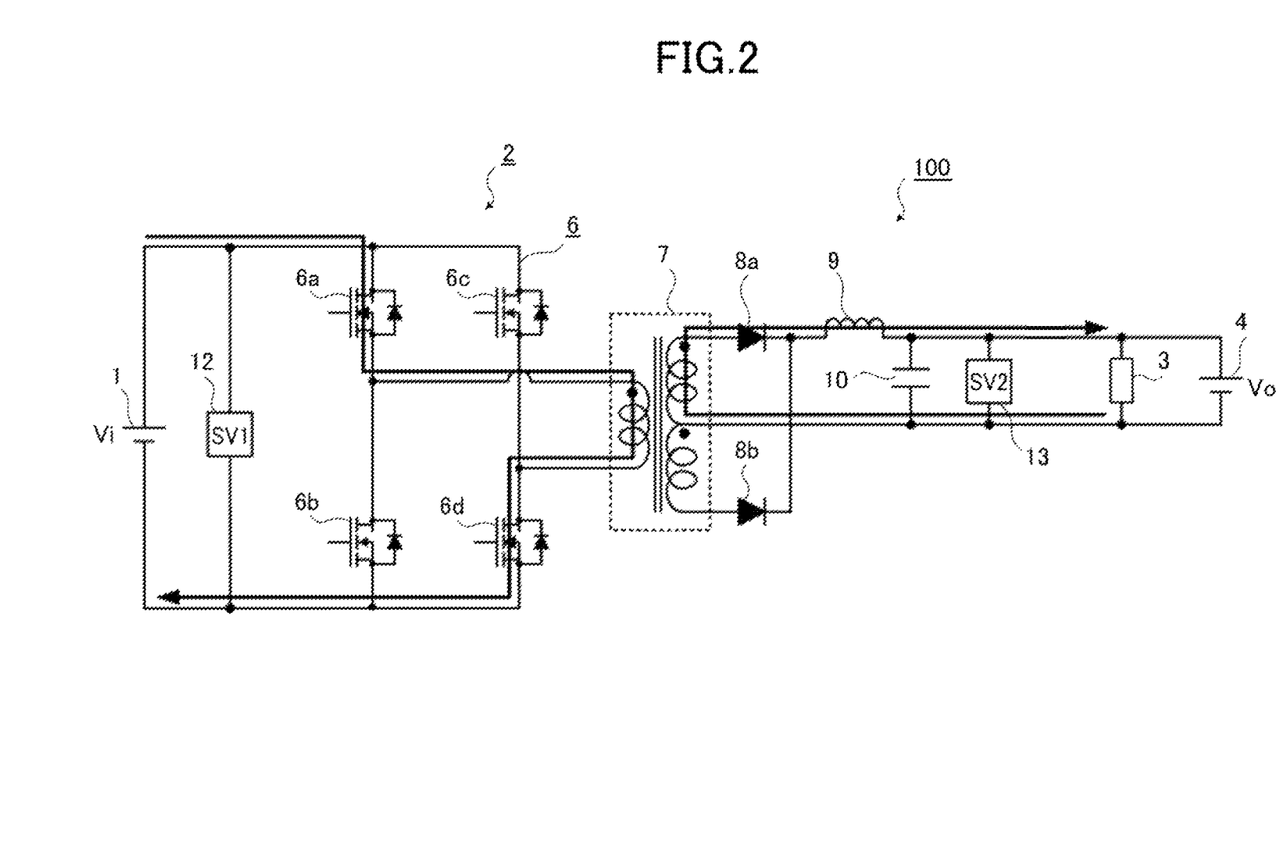
FIG. 2 is an illustration of a mode 1 operation of a power conversion unit in the power conversion device according to the first embodiment.

FIG. 2 shows mode 1, wherein the semiconductor switching elements 6a and 6d are in an on state, and the semiconductor switching elements 6b and 6c are in an off state.

At this time, current flowing on the primary winding side of the isolation transformer 7 flows along a path from the high voltage battery 1 through the semiconductor switching element 6a and the primary winding of the isolation transformer 7 to the semiconductor switching element 6d. Herein, the isolation transformer 7 transfers power from the primary side to the secondary side, and current flowing on the secondary winding side of the isolation transformer 7 flows along a path from the secondary winding of the isolation transformer 7 through the rectifying diode 8a and the smoothing reactor 9 to the load 3.

Figure 3:
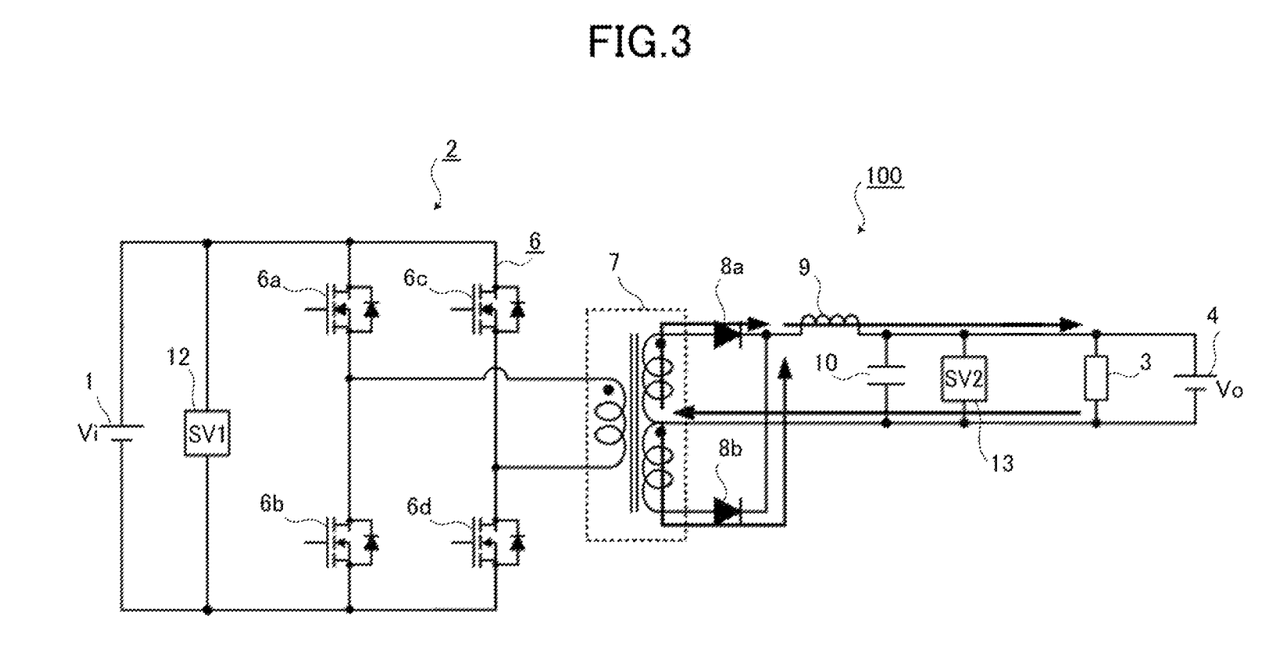
FIG. 3 is an illustration of a mode 2 operation of the power conversion unit in the power conversion device according to the first embodiment.

FIG. 3 shows mode 2, wherein the semiconductor switching elements 6a to 6d are all in an off state.

At this time, no current flows on the primary side of the isolation transformer 7, and no power is transferred to the secondary side. Note that owing to self-induction of the smoothing reactor 9, current flows along a path from the smoothing reactor 9 through the load 3, the secondary winding of the isolation transformer 7, and the rectifying diodes 8a and 8b to the smoothing reactor 9 on the secondary side.

Figure 4:
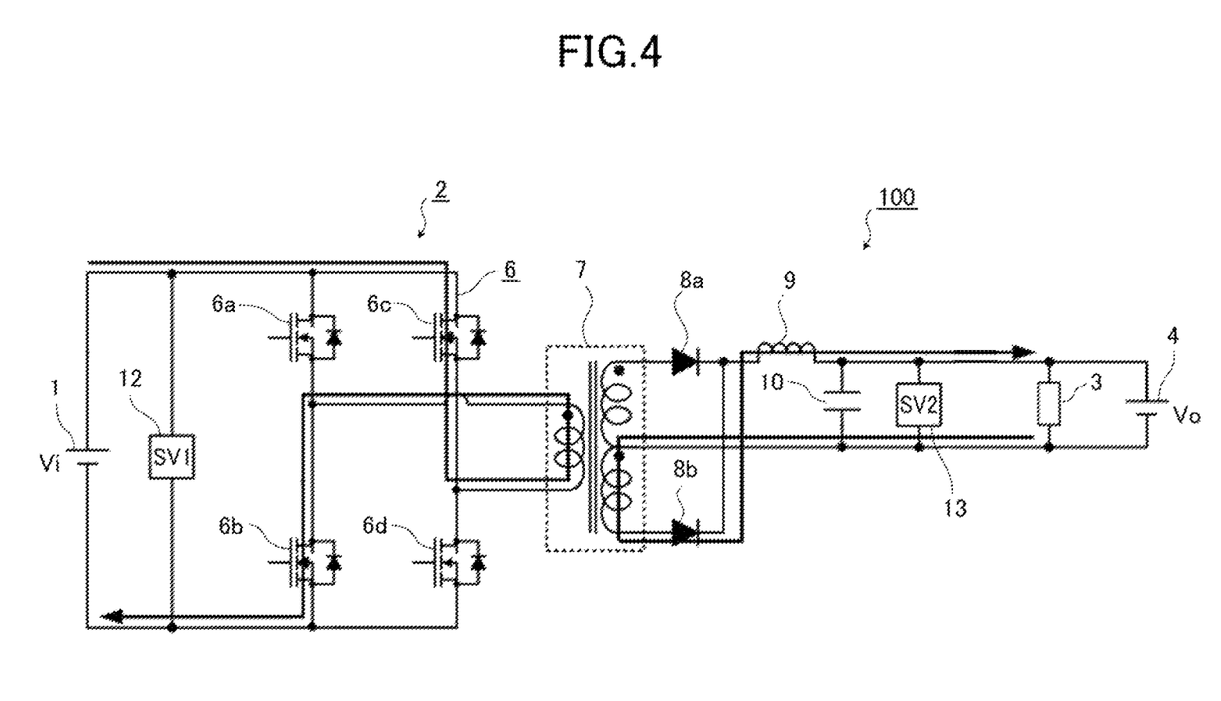
FIG. 4 is an illustration of a mode 3 operation of the power conversion unit in the power conversion device according to the first embodiment.

FIG. 4 shows mode 3, wherein the semiconductor switching elements 6a and 6d are in an off state, and the semiconductor switching elements 6b and 6c are in an on state.

At this time, current flowing on the primary winding side of the isolation transformer 7 flows along a path from the high voltage battery 1 through the semiconductor switching element 6c and the primary winding of the isolation transformer 7 to the semiconductor switching element 6b. Herein, the isolation transformer 7 transfers power from the primary side to the secondary side, and current flowing on the secondary winding side of the isolation transformer 7 flows along a path from the secondary winding of the isolation transformer 7 through the rectifying diode 8b and the smoothing reactor 9 to the load 3.

Figure 5:
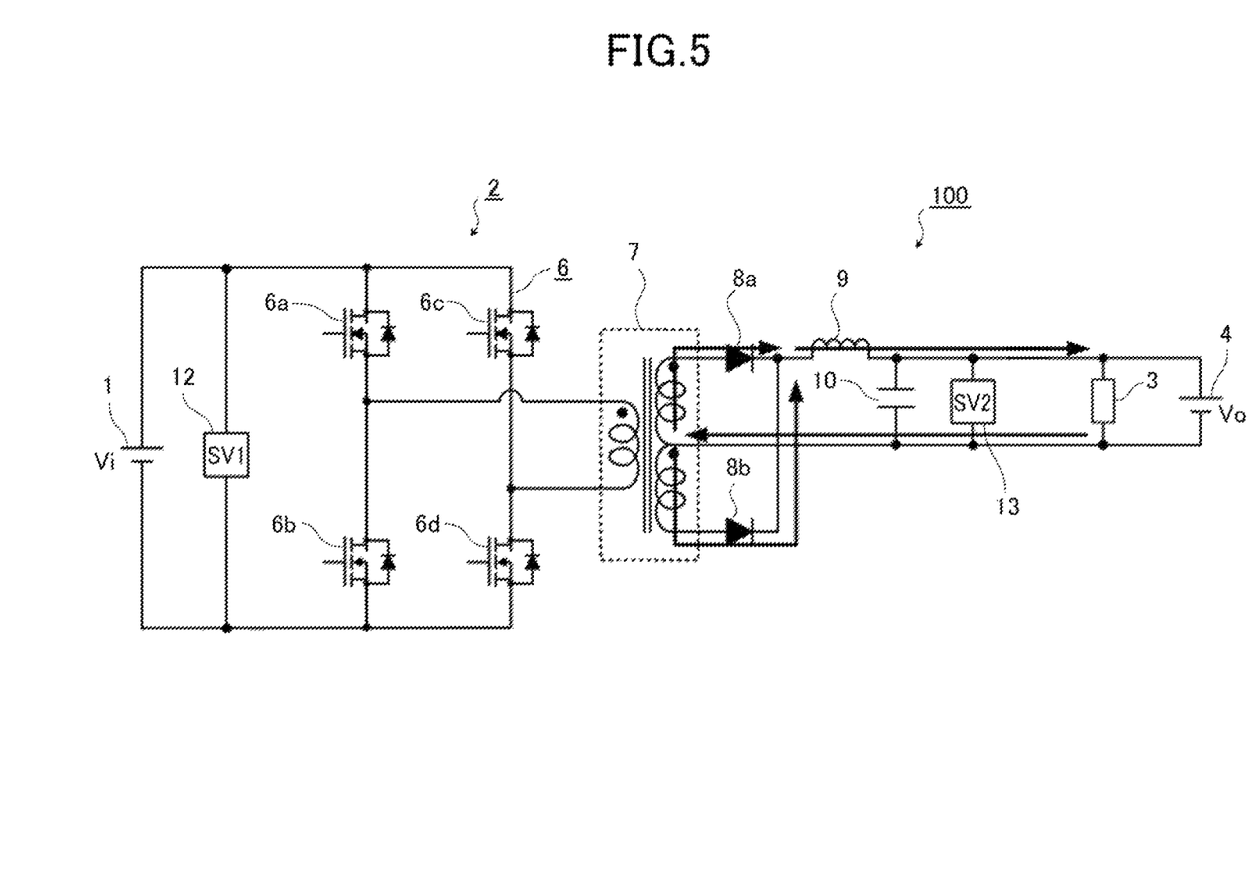
FIG. 5 is an illustration of a mode 4 operation of the power conversion unit in the power conversion device according to the first embodiment.

FIG. 5 shows mode 4, wherein the semiconductor switching elements 6a to 6d are all in an off state.

At this time, no current flows on the primary side of the isolation transformer 7, and no power is transferred to the secondary side. Note that owing to self-induction of the smoothing reactor 9, current flows along a path from the smoothing reactor 9 through the load 3, the secondary winding of the isolation transformer 7, and the rectifying diodes 6a and 8b to the smoothing reactor 9 on the secondary side.

After mode 4 ends, the operation returns to mode 1, and mode 1 to mode 4 are repeated. In each mode, an alternating current component of current flowing through the smoothing reactor 9 flows through the smoothing capacitor 10.

Figure 6:
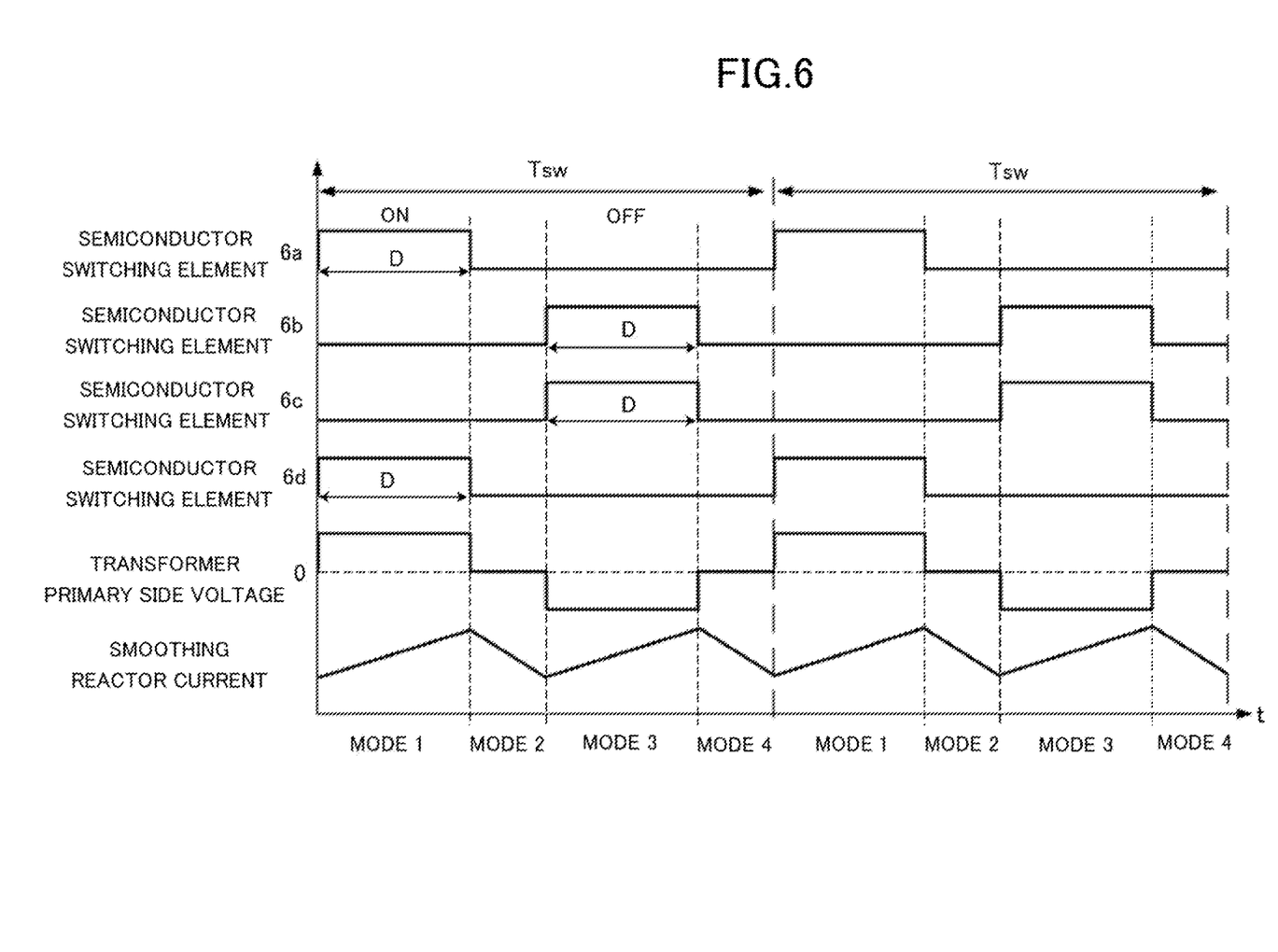
FIG. 6 is an illustration of an operation of a DC-DC converter in the power conversion device according to the first embodiment.
Figure 7:
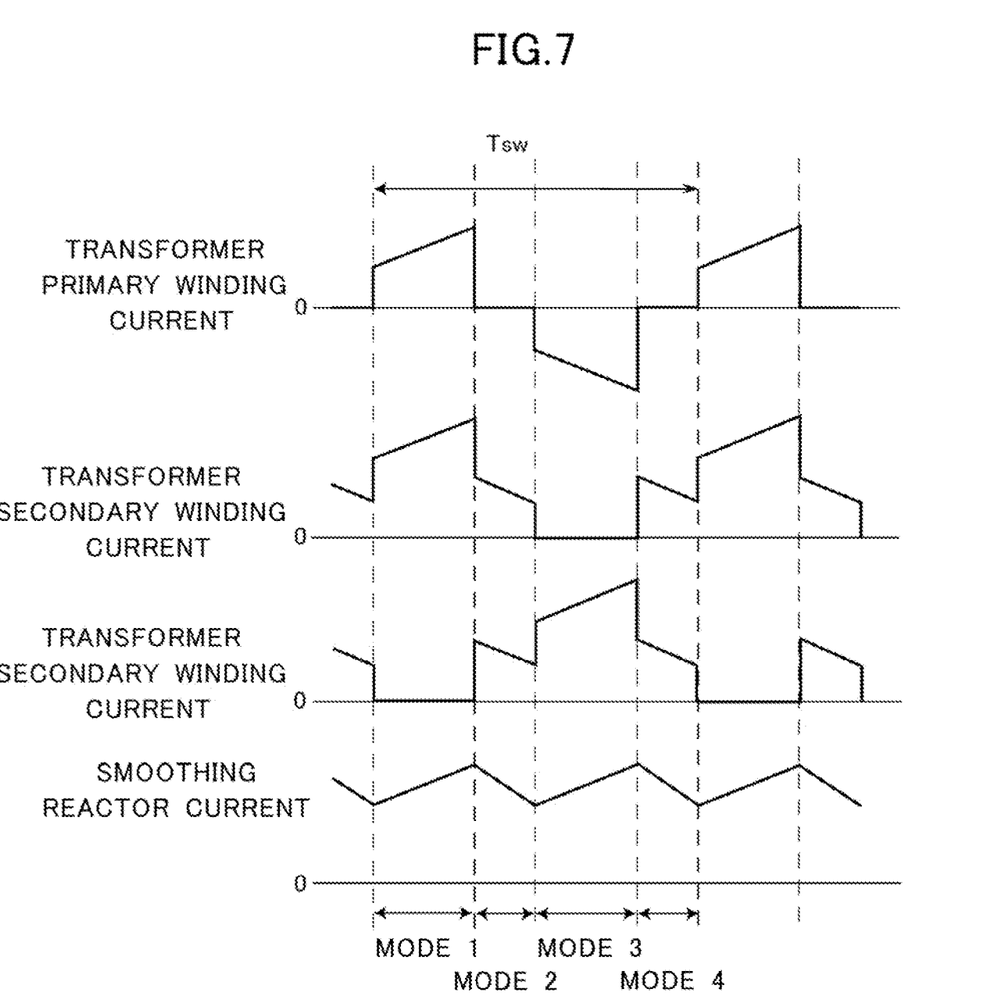
FIG. 7 is an illustration of an operation of the DC-DC converter in the power conversion device according to the first embodiment.

FIG. 6 shows a time chart of an on-off operation of each of the semiconductor switching elements 6a to 6d, the primary side voltage of the isolation transformer 7, and the current of the smoothing reactor 9 in mode 1 to mode 4 described in FIGS. 2 to 5. Also, FIG. 7 shows a time chart of the current of the primary winding and the secondary winding of the isolation transformer 7 and the current of the smoothing reactor 9 in mode 1 to mode 4 described in FIGS. 2 to 5. In FIGS. 6 and 7, Tsw indicates a switching cycle, and D indicates a duty cycle.

Returning to FIG. 1, the control unit 5 regulates a duty cycle width of the semiconductor switching elements 6a to 6d while causing the semiconductor switching elements 6a to 6d to carry out an on-off operation based on an input voltage A from an input voltage detector 12 and an output voltage B from an output voltage detector 13, thereby controlling the output voltage to a desired value. Reference signs a to d in FIG. 1 indicate signal lines from the control unit 5 to the semiconductor switching elements 6a to 6d.

Next, the isolation transformer 7 according to the first embodiment will be described. An operational magnetic flux density $B_m$ of the magnetic core of the isolation transformer 7 needs to be equal to or less than a value that takes into consideration a design margin with respect to a saturation magnetic flux density $B_s$ of a magnetic core material (generally in the region of $2 \times B_m < B_s$), in order that the magnetic core does not become magnetically saturated. Also, the operational magnetic flux density $B_m$ of the magnetic core of the isolation transformer 7 is proportional to a volt-time product, which is the product of a voltage applied to a winding of the isolation transformer 7 and a time for which the voltage is applied, and is shown as in the following Equation 1 using the output voltage $V_o$. In Equation 1, $A_e$ indicates a sectional area of the magnetic core, Fsw indicates a switching frequency, and $N_s$ indicates a number of turns on the secondary side.

$$B_m = \frac{V_o}{4 \cdot Fsw \cdot N_s \cdot A_e} \quad (1)$$

As is understood from Equation 1, the sectional area $A_e$ of the magnetic core of the isolation transformer 7 can be reduced by causing the switching frequency Fsw to increase, as a result of which the magnetic core of the isolation transformer 7 can be reduced in size.

A loss density $P_{cv}$ of the magnetic core of the isolation transformer 7 is shown as in the following Equation 2. Each of coefficients k, α, and β is a loss coefficient determined in accordance with the material of the magnetic core.

$$P_{cv} = k \cdot Fsw^\alpha \cdot B_m^\beta \quad (2)$$

In Equation 2, the loss coefficient α is smaller than β in the case of a general magnetic material. Consequently, as is understood from Equation 1, the operational magnetic flux density $B_m$ can be reduced, thereby reducing the size of the magnetic core, by causing the switching frequency Fsw to increase, and together with the reduction in size of the magnetic core, the loss density $P_{cv}$ of the magnetic core can be reduced, and a reduction in core loss (iron loss) can be realized.

Figure 8:
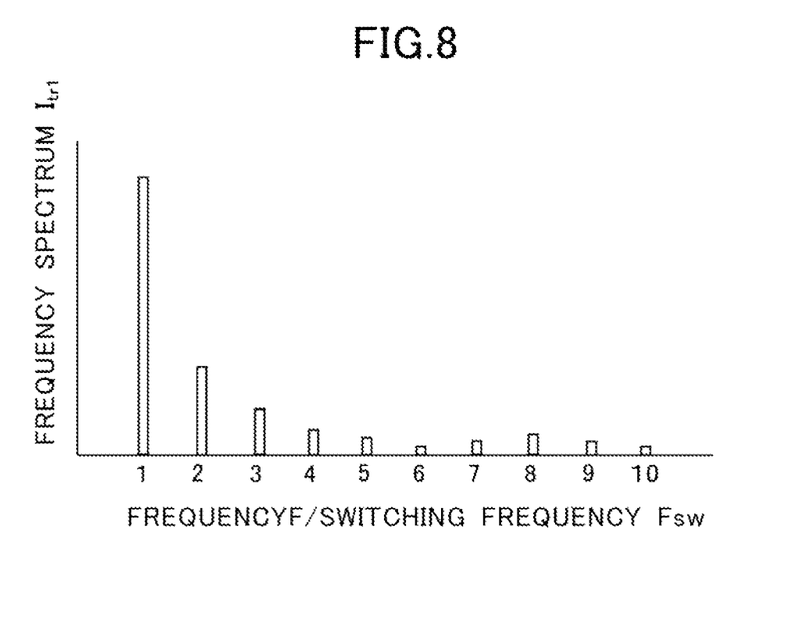
FIG. 8 is an illustration showing an example of a frequency spectrum of current flowing through a primary winding of the isolation transformer in the power conversion device according to the first embodiment.

Next, a frequency spectrum $I_{tr1}$ of current flowing through the primary winding of the isolation transformer 7 will be described, while referring to FIG. 8. FIG. 8 is an illustration showing an example of the frequency spectrum $I_{tr1}$ of the current flowing through the primary winding of the isolation transformer 7 shown in FIG. 7.

In FIG. 8, reference sign F indicates frequency, and a current spectrum is generated at a frequency of an integral multiple in the primary winding of the isolation transformer 7, with the switching frequency Fsw as a basic frequency. Consequently, when the switching frequency Fsw is caused to increase, the frequency spectrum $I_{tr1}$ of the current flowing through the primary winding of the isolation transformer 7 shifts in a high frequency direction.

Figure 9:
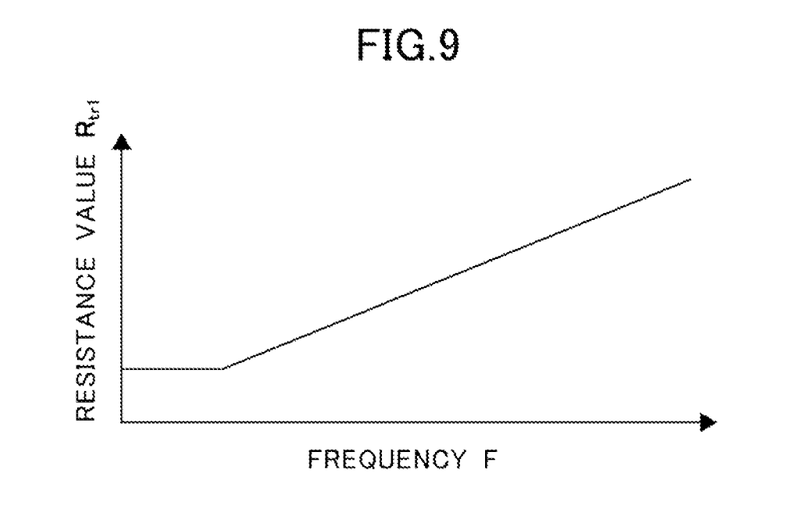
FIG. 9 is an illustration showing an example of frequency characteristics of a low resistance value of the primary winding of the isolation transformer in the power conversion device according to the first embodiment.

Next, frequency characteristics of a resistance value $R_{tr1}$ of the primary winding of the isolation transformer 7 will be described, while referring to FIG. 9. FIG. 9 is an illustration showing an example of the frequency characteristics of the resistance value $R_{tr1}$ of the primary winding of the isolation transformer 7 of FIG. 1.

As shown in FIG. 9, the resistance value $R_{tr1}$ of the primary winding of the isolation transformer 7 increases further the more the frequency F increases. Herein, when a loss in the primary winding of the isolation transformer 7 is $W_{coil1}$, $W_{coil1}$ is shown in Equation 3 as a product of the resistance value $R_{tr1}$ of the primary winding of the isolation transformer 7 and the current frequency spectrum $I_{tr1}$.

$$W_{coil1} = \Sigma R_{tr1}(F) \cdot I_{tr1}(F)^2 \quad (3)$$

As is understood from Equation 3, the resistance value $R_{tr1}$ of the primary winding of the isolation transformer 7 increases when the frequency spectrum $I_{tr1}$ of the current flowing through the primary winding of the isolation transformer 7 shifts in a high frequency direction, because of which the loss $W_{coil1}$ in the primary winding of the isolation transformer 7 increases. The secondary winding of the isolation transformer 7 has the same kinds of characteristic as the primary winding.

When loss in the primary winding or the secondary winding of the isolation transformer 7 increases, the winding temperature increases. When the winding temperature exceeds a temperature upper limit determined in accordance with the winding, an insulating member of the winding, and the like, the winding is damaged. Consequently, a method whereby the resistance value of the winding is lowered by increasing a diameter of the winding, thereby reducing loss, or a method whereby the winding is cooled by a cooling mechanism being provided separately, needs to be employed. However, when increasing the diameter of the winding or adding a cooling mechanism, a problem occurs in that the isolation transformer 7 increases in size.

The aforementioned problem relates to an increase in switching frequency of a semiconductor switching element, and is a problem that greatly reduces the advantage of reducing the size of an isolation transformer by increasing switching frequency.

Focusing on the aforementioned problem, the isolation transformer 7, which enables the resistance values of the primary winding and the secondary winding to be reduced, is used in the first embodiment. The isolation transformer 7 in the first embodiment is such that magnetic flux generated by current flowing through each of the primary winding and the secondary winding is reduced by primary winding layers and secondary winding layers being alternately stacked. Because of this, magnetic interference between the primary winding and the secondary winding is alleviated, and moreover, the isolation transformer 7 has a characteristic such that when the number of turns in each of the primary winding layers is not constant, a winding layer with the greatest number of turns is disposed as a layer other than an outermost layer.

As will be described hereafter, the aforementioned technical characteristic of providing the isolation transformer 7 is such that even when causing the switching frequency of the semiconductor switching elements 6a to 6d to increase, an increase in winding size is restricted, and a reduction in size of the isolation transformer 7 is realized, together with which an increase in efficiency of the power conversion device 100 can be achieved.

Figure 10:
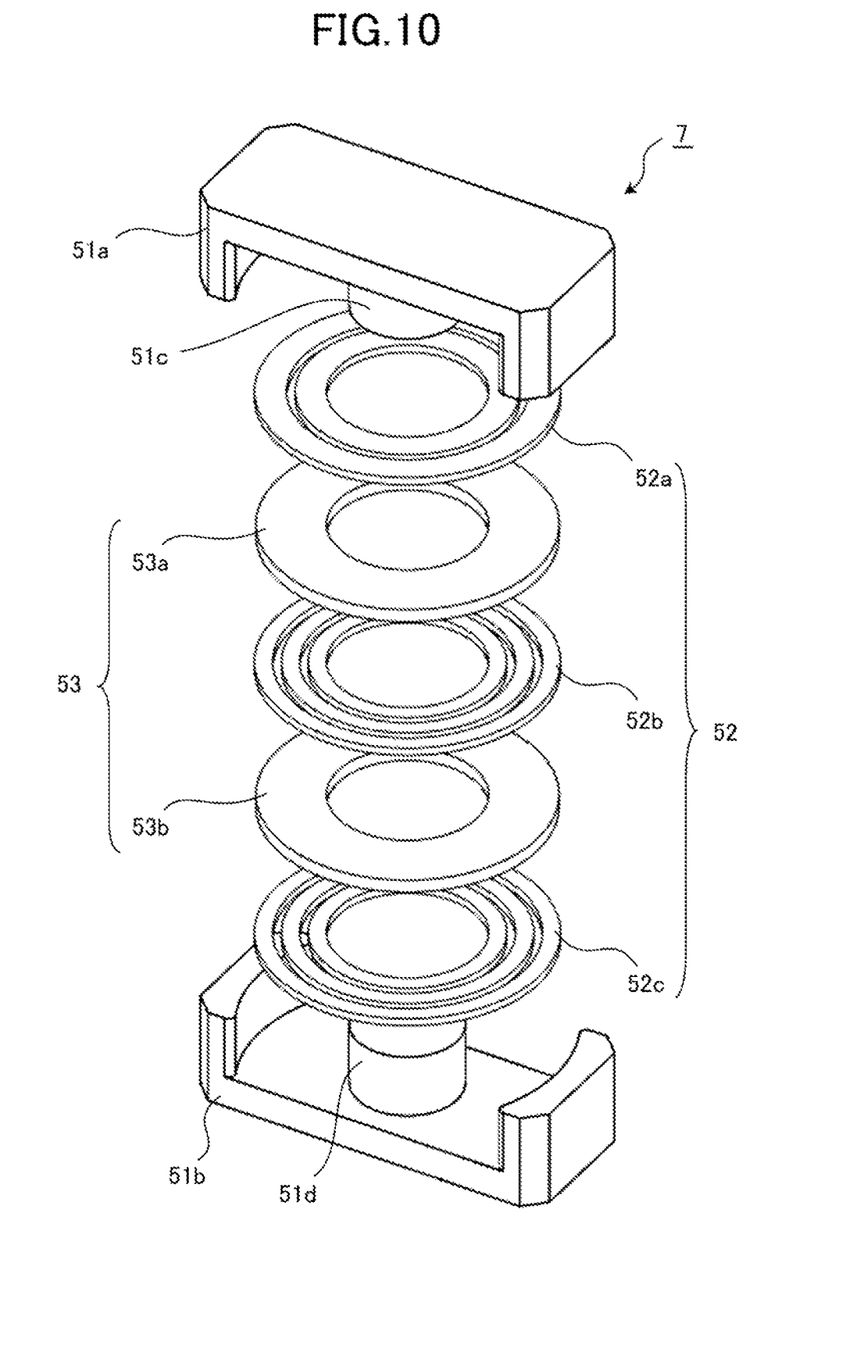
FIG. 10 is an exploded perspective view showing an example of the isolation transformer according to the first embodiment.

Firstly, a configuration of the isolation transformer 7 will be described, while referring to FIG. 10. FIG. 10 is a configuration diagram showing an example of the isolation transformer 7 according to the first embodiment. In FIG. 10, the isolation transformer 7 is depicted using an exploded perspective view.

In FIG. 10, the isolation transformer 7 applied to the power conversion device 100 has a magnetic core configured of a pair of E-form core portions 51a and 51b, disposed opposing each other, and a winding unit formed of a primary winding 52 and a secondary winding 53, each configured of one or more winding layers.

The primary winding 52 and the secondary winding 53 are fitted over protruding portions 51c and 51d protruding from centers of the core portion 51a and the core portion 51b respectively, and end face portions of the core portion 51a and the core portion 51b are connected to each other. By so doing, a shell-type transformer wherein the primary winding 52 and the secondary winding 53 are housed in the magnetic core is formed.

By adopting a shell-type transformer, a coupling ratio of the primary winding 52 and the secondary winding 53 can be increased, and leakage inductance can be reduced. Because of this, a switching surge occurring in a semiconductor switching element due to leakage inductance, which is a problem when carrying out a high frequency drive, can be reduced. Also, when adopting a shell-type transformer, wherein cooling of the winding unit is generally difficult, the advantage obtained by reducing winding loss is considerable.

In FIG. 10, the primary winding 52 is configured of three winding layers 52a, 52b, and 52c, the secondary winding 53 is configured of two winding layers 53a and 53b, and the winding unit is configured by the winding layers being alternately stacked in order that winding layers of the same winding are not neighboring. A cross-section of the windings configuring the winding layers 52a, 52b, and 52c and the winding layers 53a and 53b is of a quadrilateral form that is a rectangle having a long side and a short side.

Also, winding layers whose numbers of turns differ at two turns, three turns, and three turns respectively exist among the winding layers 52a, 52b, and 52c configuring the primary winding 52, and among these, the three-turn winding layer 52b, which has the greatest number of turns, is disposed as a layer other than an outermost layer.

Also, a reason for the winding cross-section being of a quadrilateral form is that by increasing a winding space factor, the overall winding unit can be reduced in size, which can contribute to a reduction in winding resistance. Also, a window frame of the magnetic core can be reduced in size owing to the winding unit becoming smaller, magnetic core loss can be reduced, and the overall isolation transformer can conceivably be reduced in size.

Furthermore, a winding layer whose cross-section is of a quadrilateral form that is a rectangle having a long side and a short side is desirably disposed in such a way that a stacking direction of the winding layer forms the long side. This is because although current in a winding interior is biased due to a proximity effect, current flows over a large area owing to this configuration, as will be described hereafter.

Next, a principle of reducing the resistance value of the primary winding 52 and the secondary winding 53 in the isolation transformer 7 shown in FIG. 10 will be described.

When the primary winding 52 and the secondary winding 53 are in a conductive state in the isolation transformer 7 shown in FIG. 10, magnetic flux generated by current flowing through the primary winding 52 interlinks across the secondary winding 53, and magnetic flux generated by current flowing through the secondary winding 53 interlinks across the primary winding 52.

In a conductor, an induction voltage that accords with an amount of change in interlinking magnetic flux is generated, an eddy current flows, and a bias occurs in the current flowing inside the conductor. This magnetic interference is known as a proximity effect, and in the primary winding 52 and the secondary winding 53 of the isolation transformer 7, for example, currents flow opposed in the primary winding 52 and the secondary winding 53, because of which current bias is generated in the winding interior in a direction in which the flowing currents attract each other. Also, as currents flow in the same direction in the primary windings 52, current bias is generated in the interiors of the primary winding layers 52a, 52b, and 52c in a direction in which the flowing currents repel each other.

Figure 11:
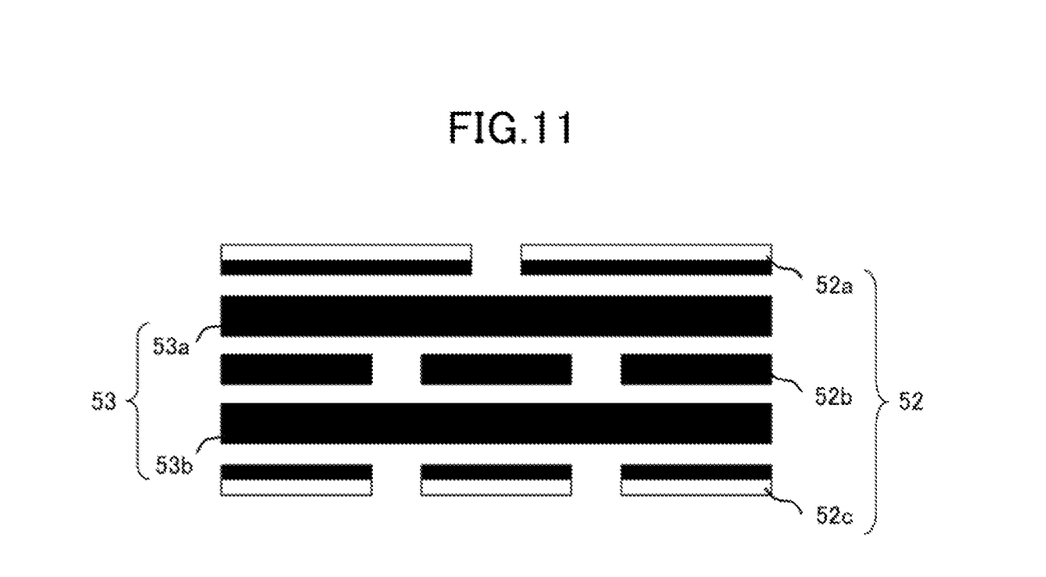
FIG. 11 is a sectional view of a winding unit of the isolation transformer according to the first embodiment, and a drawing schematically showing current flowing due to a proximity effect.

FIG. 11 is a sectional view of the winding unit of the isolation transformer 7, and a drawing schematically showing how current flows due to a proximity effect. In FIG. 11, black indicates a portion of a winding layer in which current flows, and white indicates a portion of a winding layer in which no current flows.

With regard to the winding layers 52a and 52c disposed as outermost layers, current is biased to one side, that is, to the winding layer 53a and 53b sides, due to the effect of being in proximity to the winding layers 53a and 53b respectively. With regard to the winding layers 53a, 53b, and 52b disposed as layers other than an outermost layer, windings in which currents flow opposed exist on either side of each, because of which current is attracted to both sides, as a result of which there is a comparatively even current distribution.

When considering in terms of the primary winding 52, the winding layers 52a and 52c are such that current bias is occurring in each winding interior, which is equivalent to a case in which the winding sectional area decreases, as a result of which the winding resistance value increases. As opposed to this, there is an even current distribution in the winding layer 52b, because of which an increase in the winding resistance value is restricted with respect to that of the winding layers 52a and 52c.

Figure 12:
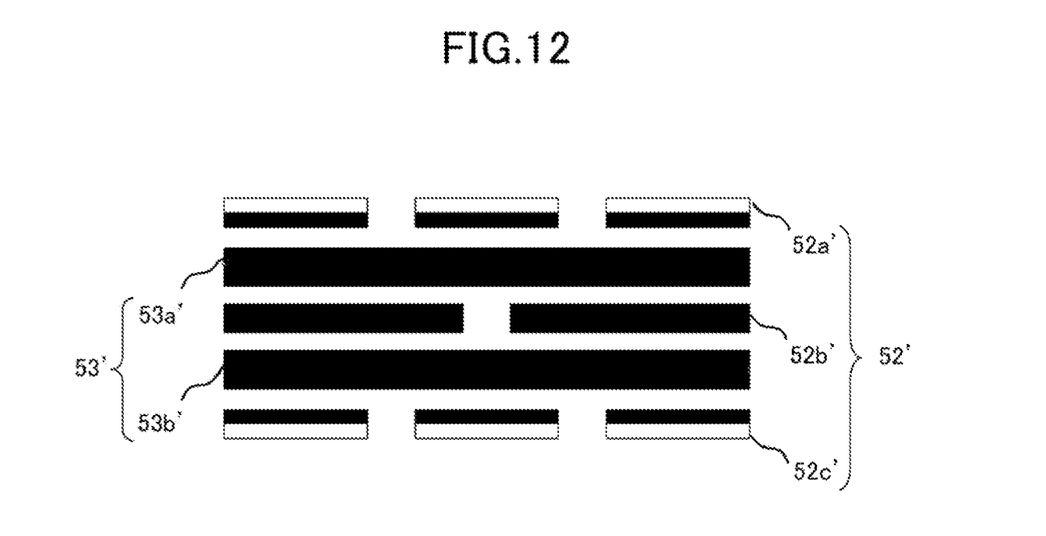
FIG. 12 is an example of a sectional view of a winding unit of an existing isolation transformer, and a drawing schematically showing current flowing due to a proximity effect.

Herein, consideration will be given to a case wherein the winding layer with the greatest number of turns is not disposed as a layer other than an outermost layer in the isolation transformer 7 shown in FIG. 10. FIG. 12 is a sectional view of the winding unit when the numbers of turns of winding layers 52a', 52b', and 52c' configuring a primary winding 52' are three, two, and three, and a drawing schematically showing how current flows due to a proximity effect. In FIG. 12, reference sign 53' indicates a secondary winding, and reference signs 53a' and 53b' indicate winding layers configuring the secondary winding 53'.

In the same way as in the case of FIG. 11, the winding layers 52a' and 52c' disposed as outermost layers are such that current is biased to one side in the winding interior, and there is a comparatively even current distribution in the winding layers 53a', 53b', and 52b', which are layers other than an outermost layer.

Herein, when comparing the case of FIG. 11 and the case of FIG. 12, the resistance value in the case of FIG. 11 is smaller as a resistance value when seen in terms of the whole primary winding 52. This is because a resistance value improvement rate when current is biased and when current flows evenly is intrinsically higher with a three-turn winding layer, which has a greater direct current resistance value, than with a two-turn winding layer.

Because of this, an increase in the resistance value of a winding at high frequency can be restricted, and the small, highly efficient isolation transformer 7 can be realized. Also, in the case of the insulated DC-DC converter 2 including the isolation transformer 7 according to the first embodiment, the isolation transformer 7, which is a constituent part having a comparatively large form and generating a large amount of heat even in the insulated DC-DC converter 2, can be reduced in size, whereby the extremely small insulated DC-DC converter 2 can be provided.

The semiconductor switching elements 6a to 6d, which are constituent parts of the DC-DC converter 2, are desirably elements formed of, for example, silicon semiconductors or wide bandgap semiconductors. A wide bandgap semiconductor is a semiconductor in which silicon carbide, a gallium nitride-based material, or a diamond is used. A semiconductor switching element formed of a wide bandgap semiconductor can be used in a high voltage region in which unipolar operation is difficult with a silicon semiconductor, and is appropriate for high speed switching and an ultra-high carrier frequency operation, because of which switching frequency can be increased. Consequently, advantages are further achieved by applying the DC-DC converter 2 including semiconductor switching elements formed of wide bandgap semiconductors, and a further reduction in size of the isolation transformer 7 can be realized.

Also, it is desirable that the secondary winding 53 of the isolation transformer 7 of the DC-DC converter 2 is a center tapped type, that a center tap portion and the cooler 11 of the power conversion device 100 are of equal potentials, and that the two are thermally connected. Generally, an insulated DC-DC converter is such that a large current flows through a secondary winding, which forms a low voltage side, because of which a sectional area of the secondary winding is increased. Because of this, thermal resistance of the secondary winding can be reduced by the center tap portion of the secondary winding being thermally connected to a cooler.

The isolation transformer 7 according to the first embodiment is of a configuration wherein the winding layers 52a, 52b, and 52c configuring the primary winding 52 and the winding layers 53a and 53b configuring the secondary winding 53 are alternately stacked, because of which the secondary winding 53, which has small thermal resistance, is dispersed inside the winding unit, and the primary winding 52 on the high voltage side, which is normally difficult to cool, can be effectively cooled via the secondary winding 53. Consequently, advantages are further achieved, and a further reduction in size of the isolation transformer 7 can be realized, by the isolation transformer 7 according to the first embodiment being a center tapped type, and the center tap portion being thermally connected to the cooler 11 of the power conversion device 100.

Also, it is further preferable that either one, or both, of the primary winding 52 and the secondary winding 53 configuring the isolation transformer 7 is configured of aluminum. A skin effect caused by an eddy current and a proximity effect are included as factors in winding high frequency resistance increasing. Although copper is frequently used as an isolation transformer winding, using aluminum, which has a higher resistivity in comparison with copper, means that an occurrence of an eddy current is restricted, and an increase in resistance value caused by a high frequency drive can be alleviated. Furthermore, aluminum is lower priced and has a lower specific gravity than copper. Because of this, using aluminum for the windings of the isolation transformer 7 used at high frequency, as shown in the first embodiment, means that the lightweight, low-cost isolation transformer 7 can be realized, while restricting an increase in winding resistance caused by a high frequency drive.

Furthermore, when the secondary winding 53 of the isolation transformer 7 is a center tapped type, the primary winding 52 being configured of aluminum and the secondary winding 53 being configured of copper is most desirable. When looking at the time chart of current flowing through the transformer windings shown in FIG. 7, it is understood that in the case of a center tapped type, the primary winding current is only an alternating current component, while the secondary winding current is such that an alternating current component is superimposed on a direct current component. Because of this, an optimal configuration can be adopted by using aluminum, which can restrict an increase in high frequency resistance, for the primary winding 52 through which only alternating current flows, and using copper, which can reduce direct current resistance, for the secondary winding 53 through which alternating current flows superimposed on direct current.

Although the present application is described above in terms of an exemplifying embodiment, it should be understood that the various features, aspects, and functionality described in the embodiment are not limited in their applicability to the particular embodiment with which they are described, but instead can be applied, alone or in various combinations to the embodiment. It is therefore understood that numerous modifications which have not been exemplified can be devised without departing from the scope of the present application. For example, at least one of the constituent components may be modified, added, or eliminated.

What is claimed is:

1. An isolation transformer, comprising:
a core portion that forms a magnetic circuit; and
at least two kinds of winding, on a high voltage side and a low voltage side, wound around the core portion,
each of the two kinds of winding being formed in winding layers, wherein
the two kinds of winding include windings formed in a multiple of winding layers,
a winding layer having a different number of turns exists in one or more kinds of the two kinds of winding among the windings formed in the multiple of winding layers,
winding layers wherein current flows in the same direction are stacked in such a way as not to be neighboring, and at least one of winding layers having the greatest number of turns is disposed as a layer other than an outermost layer.

2. The isolation transformer according to claim 1, wherein a cross-section of the winding is of a quadrilateral form.

3. The isolation transformer according to claim 2, wherein the quadrilateral form is a rectangle having a long side and a short side, and a face at which neighboring winding layers oppose forms the long side.

4. The isolation transformer according to claim 1, wherein the isolation transformer is of a shell type wherein the winding is enclosed by the core portion.

5. The isolation transformer according to claim 1, wherein at least one of the two kinds of winding is configured of aluminum.

6. The isolation transformer according to claim 1, wherein, of the two kinds of winding, that on the high voltage side is configured of aluminum, and that on the low voltage side is configured of copper.

7. A power conversion device, comprising:
the isolation transformer according to claim 1; and
a power conversion unit connected to the isolation transformer.

8. The power conversion device according to claim 7, wherein an insulated DC-DC converter is configured of the isolation transformer and the power conversion unit.

9. The power conversion device according to claim 7, wherein the power conversion unit includes a semiconductor switching element, and
the semiconductor switching element is an element formed of a wide bandgap semiconductor.

10. The power conversion device according to claim 9, wherein the wide bandgap semiconductor is a semiconductor in which silicon carbide, a gallium nitride-based material, or a diamond is used.

11. The power conversion device according to claim 7, comprising a cooler, wherein the isolation transformer is configured of a center tapped type including two low voltage side windings, and a center tap portion of the low voltage side windings is connected to the cooler.

12. The isolation transformer according to claim 2, wherein the isolation transformer is of a shell type wherein the winding is enclosed by the core portion.

13. The isolation transformer according to claim 2, wherein at least one of the two kinds of winding is configured of aluminum.

14. The isolation transformer according to claim 2, wherein, of the two kinds of winding, that on the high voltage side is configured of aluminum, and that on the low voltage side is configured of copper.

15. A power conversion device, comprising:
the isolation transformer according to claim 2; and
a power conversion unit connected to the isolation transformer.

16. The power conversion device according to claim 15, wherein an insulated DC-DC converter is configured of the isolation transformer and the power conversion unit.

17. The power conversion device according to claim 15, wherein the power conversion unit includes a semiconductor switching element, and
the semiconductor switching element is an element formed of a wide bandgap semiconductor.

18. The power conversion device according to claim 17, wherein the wide bandgap semiconductor is a semiconductor in which silicon carbide, a gallium nitride-based material, or a diamond is used.

19. The power conversion device according to claim 15, comprising a cooler, wherein the isolation transformer is configured of a center tapped type including two low voltage side windings, and a center tap portion of the low voltage side windings is connected to the cooler.

* * * * *